(12) United States Patent
Audoin et al.

(10) Patent No.: US 7,582,480 B2
(45) Date of Patent: Sep. 1, 2009

(54) DIAGNOSTIC PROCESS FOR AN EXHAUST GAS CATALYTIC CONVERTER OF A HEAT ENGINE AND VEHICLE USING THIS PROCESS

(75) Inventors: Arnaud Audoin, Paris (FR); Alain Sassi, Montigny le Bretonneux (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 782 days.

(21) Appl. No.: 11/068,539

(22) Filed: Feb. 28, 2005

(65) Prior Publication Data

US 2005/0191752 A1    Sep. 1, 2005

(30) Foreign Application Priority Data

Feb. 27, 2004  (FR) .................................. 04 50388

(51) Int. Cl.
*G01N 31/00* (2006.01)
(52) U.S. Cl. ........................................................ 436/37
(58) Field of Classification Search ..................... 436/37
See application file for complete search history.

(56) References Cited

U.S. PATENT DOCUMENTS

| | | | |
|---|---|---|---|
| 5,408,215 A | 4/1995 | Hamburg |
| 5,743,084 A | 4/1998 | Hepburn |
| 5,937,638 A | 8/1999 | Akazaki et al. |
| 6,226,982 B1 | 5/2001 | Poggio et al. |
| 6,263,666 B1 | 7/2001 | Kubo et al. |
| 6,327,848 B1 | 12/2001 | Poggio et al. |
| 6,341,487 B1 | 1/2002 | Takahashi et al. |
| 6,345,498 B2 | 2/2002 | Yonekura et al. |
| 6,383,267 B1 * | 5/2002 | Takaku et al. .................. 96/111 |
| 6,418,711 B1 | 7/2002 | Surnilla et al. |
| 6,679,050 B1 | 1/2004 | Takahashi et al. |
| 2002/0184877 A1 | 12/2002 | Ishii et al. |
| 2003/0041592 A1 | 3/2003 | Nishioka et al. |
| 2005/0191754 A1 | 9/2005 | Audouin et al. |

FOREIGN PATENT DOCUMENTS

EP    1 384 866 A1    1/2004

* cited by examiner

*Primary Examiner*—Walter D Griffin
*Assistant Examiner*—Bobby Ramdhanie
(74) *Attorney, Agent, or Firm*—Nicolas E. Seckel (57) ABSTRACT

The present invention pertains to a process for diagnosing a catalytic converter processing the exhaust gases of a heat engine using a trap that stores and then reduces the nitrogen oxides (NOx) contained in these gases, these reductions being actuated as a function of the storage capacity of the trap. According to the present invention, such a process is characterized in that the oxygen ratio present in the exhaust gases downstream of the trap is measured by a sensor, and in that the storage capacity of the trap is determined by considering the time needed for the sensor to detect a threshold oxygen ratio in these gases during a reduction of the nitrogen oxides (NOx).

8 Claims, 6 Drawing Sheets

DIAGNOSTIC PROCESS FOR AN EXHAUST GAS CATALYTIC CONVERTER OF A HEAT ENGINE AND VEHICLE USING THIS PROCESS

FIELD OF THE INVENTION

The present invention pertains to a process for diagnosing a catalytic converter processing the exhaust gases of a heat engine and to a vehicle using this process, and in particular by means of a nitrogen oxide trap designed to reduce the nitrogen oxide content present in these exhaust gases.

BACKGROUND

It is known to equip a vehicle 100 (FIG. 1) with a catalytic converter designed to process the exhaust gases 106 emitted by its engine 102, and this catalytic converter may be of the nitrogen oxide (NOx) trap 104 type.

Figure 1:
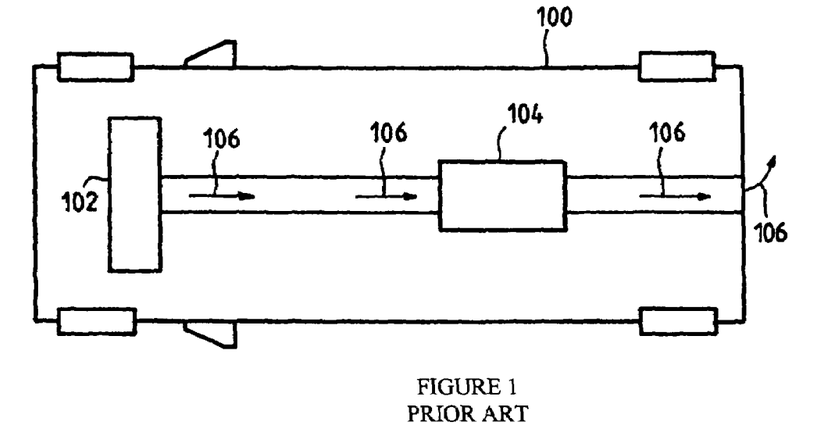
FIG. 1, already described, schematically shows a prior-art processing of exhaust gases of a heat engine by a nitrogen oxide trap, FIGS. 2a and 2b, already described, show efficiency variations of a nitrogen oxide trap.

In this case, this trap 104 consists of materials with an affinity for nitrogen oxides, in order, at first, to retain the latter when the gases 106 pass through the trap 104 and subsequently to make it possible to reduce their nitrogen ($N_2$) content. In fact, such a trap 104 alternates between two modes of operation, which are characteristic of the nitrogen oxide trap and are described in detail below:

A first mode of operation corresponds to a storage of the nitrogen oxides, during which the trap 104 collects the latter in the exhaust gases 106.

This mode corresponds to a so-called "lean" operation of the engine such that the oxygen is present in excess compared to the fuel. In this case, the richness r of the mixture, which is equal to the ratio of the quantity of fuel to the quantity of oxygen, is less than one.

During this first mode of operation, the storage of nitrogen oxides is limited by the storage capacity of the trap 104, which can be defined as the maximum mass $M_{ax}$ of nitrogen oxides that this trap 104 can collect.

By considering the entering NOx mass $M_{ent}(t)$ and the exiting NOx mass $M_{exit}(t)$ at a given instant t, the storage efficiency E(t) of the trap 104 can be defined as the difference between the entering mass $M_{ent}(t)$ and the exiting mass $M_{exit}(t)$ of nitrogen oxides actually stored in the trap 104, divided by the nitrogen oxide entering mass $M_{ent}(t)$.

Such a definition thus corresponds to the following formula (1):

$$E(t) = \frac{M_{ent}(t) - M_{exit}(t)}{M_{ent}(t)} \quad (1)$$

This formula (1) reflects the decrease in the efficiency E(t) of a nitrogen oxide trap as the nitrogen oxide mass M(t) stored tends toward the maximum nitrogen oxide mass $M_{ax}(T)$ that can be stored.

Figure 2A:
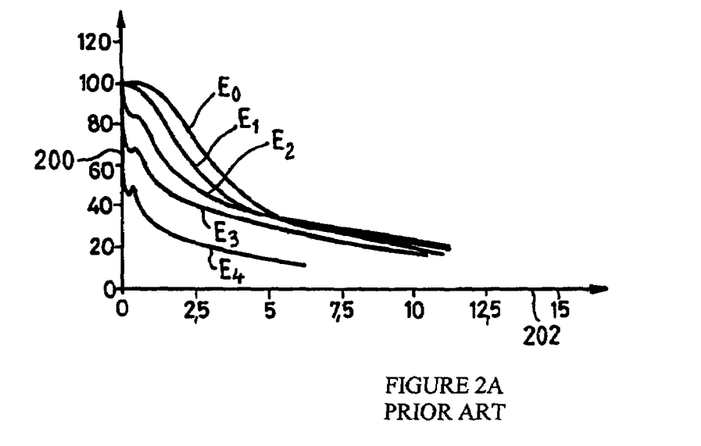
Figure 2B:
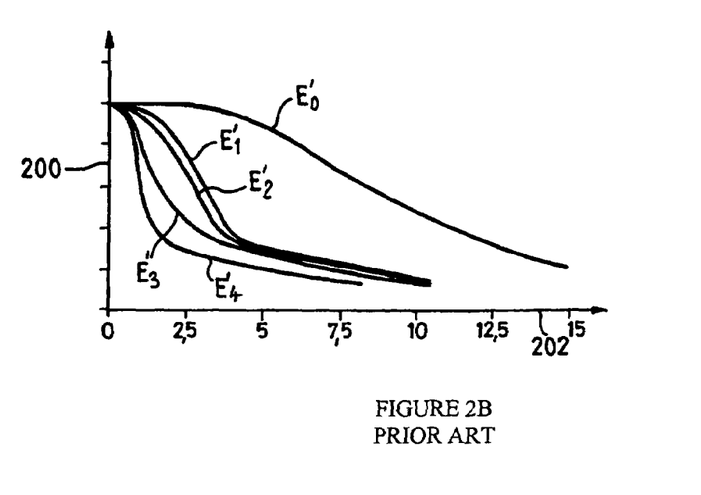

This decrease is empirically measurable as is shown in FIGS. 2a and 2b, which plot the efficiency E(t) (ordinate 200, in percentage) of the nitrogen oxide trap 104 against the nitrogen oxide mass (abscissa 202, in grams) stored in this trap 104.

Furthermore, FIG. 2a also shows that the efficiency E(t) of the nitrogen oxide trap also decreases when the quantity of sulfur (S) collected by the trap increases in the latter, this decrease being due to a lowering of the storage capacity of the trap.

In fact, the efficiencies $E_0$, $E_1$, $E_2$, $E_3$ and $E_4$, measured for traps having a sulfur content close to 0, 1, 2, 3 and 4 grams per liter, respectively, are decreasing for a same stored quantity of nitrogen oxides.

This is why it is necessary to carry out operations for the removal of sulfur from storage at regular intervals in order to recover the storage capacity.

However, such operations of removing sulfur have the drawback of irreversibly reducing the storage capacity, and therefore the efficiency, of the trap on the long term as shown below by means of FIG. 2b, which shows efficiencies $E'_0$, $E'_1$, $E'_2$, $E'_3$ and $E'_4$ measured for traps having undergone increasing numbers of sulfur storage/removal cycles (0, 5, 10, 18 and 30, respectively), and the higher this number of cycles, the lower these efficiencies are.

In fact, these sulfur removal operations subject the trap to high temperatures (greater than 600° C.) for a period generally ranging from 4 to 20 minutes, which brings about the degradations, called thermal aging, of the catalytic phase of the trap.

This is why it is known to check the frequency of the removal of sulfur of a trap by determining the quantity of sulfur received by the latter from the consumption of the vehicle and from a sulfur content attributed to the fuel.

A second mode of operation of the trap 104 corresponds to the nitrogen ($N_2$) reduction of the nitrogen oxides collected by this trap, the latter reacting with the reducers (HC: hydrocarbons, CO: carbon monoxide and $H_2$: hydrogen) supplied by the engine 102 via the exhaust gases 106.

For this, the quantity of reducers supplied to the trap 104 is increased by means of a so-called "rich" operation of the engine 102, the quantity of fuel introduced in the engine being greater than the quantity of oxygen in relation to stoichiometric conditions, and the richness r of the mixture is greater than 1.

This mode of removal requires a good determination of the quantity of nitrogen oxides present in the trap 104 in order to actuate the engine in such a way that it supplies the optimal richness, called r, defined as the ratio between the quantity of oxygen (oxidant) and the quantity of reducers (HC, CO and $H_2$) in the exhaust gases.

Actually, if there is a lack of oxygen compared to the reducers, the latter are emitted into the environment, while the reduction of nitrogen oxides would be incomplete due to a lack of reducers if an excess of oxygen was present.

This determination is currently made by means of an operation model of the trap 104, which aims at predetermining the storage capacity of the latter as a function, for example, of the number of times nitrogen oxides or sulfur have been removed, in order to optimally decide on new removal operations.

SUMMARY OF THE INVENTION

The present invention is a result of the observation that the oxidation capacity of a catalytic converter varies greatly during the operation of the nitrogen oxide trap, as shown below by means of FIGS. 5a and 5b.

Thus, the present invention pertains to a process for diagnosing the oxidation capacity of a catalytic converter processing the exhaust gases of a heat engine by means of a trap storing and then reducing the nitrogen oxides contained in these gases, characterized in that the oxygen content of the exhaust gases downstream of the trap is determined by means of a sensor, and in that the level of the signal emitted by this sensor is used to determine the oxidation capacity of the trap.

Such a process has the advantage of making possible a simple measurement to be made of the oxidation capacity of a nitrogen oxide trap by means of means having a limited cost, such as a sensor measuring an oxygen ratio in exhaust gases.

According to one embodiment, the level of the signal depends on the quantity of hydrocarbons or reducers present in the exhaust gases.

In one embodiment, the storage capacity of the trap is determined by considering the time that is needed for the sensor to detect a threshold oxygen ratio in these gases during a reduction of the nitrogen oxides.

According to one embodiment, a lambda sensor is used to determine the time to be considered by measuring the oxygen ratio in the exhaust gases downstream of the trap.

In one embodiment, a lambda sensor upstream of the trap is used to determine the time in question starting from a signal sent by this sensor upstream of the trap.

According to one embodiment, the removal of sulfur from the trap is actuated when the time measured reaches a threshold time.

In one embodiment, removal of nitrogen oxides (NOx) from the trap is actuated successively to a removal of sulfur in such a way that, if the time needed to detect a threshold oxygen ratio reaches a threshold time, the value of the storage capacity of the trap in question is reduced.

According to one embodiment, the level of the signal sent by the sensor is considered to be in volts.

The present invention also pertains to a vehicle provided with means for diagnosing a catalytic converter processing the exhaust gases of a heat engine by means of a trap storing and then reducing the nitrogen oxides (NOx) contained in these gases, characterized in that it comprises means for measuring the oxygen ratio present in the exhaust gases downstream of the trap by means of a sensor, and in that it comprises means for determining the oxidation capacity of the trap by considering the level of the signal sent by this sensor according to a process in accordance with one of the above embodiments.

BRIEF DESCRIPTION OF THE DRAWINGS

Other features and advantages of the present invention shall become apparent with the description provided below, by way of illustrative and nonlimiting example, with reference to the attached figures, in which.

DETAILED DESCRIPTION

As indicated above, the operation drift of a nitrogen oxide trap may reach high values as shown below by means of FIGS. 3a and 3b, pertaining to a new nitrogen oxide trap, and 3c and 3d, pertaining to the same trap after a significant use of the latter, for example, after 10 to 20 sulfur storage/removal sequences.

Figure 3A:
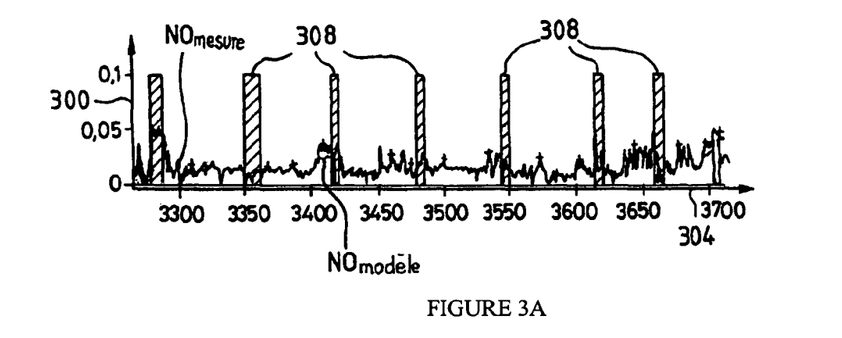
FIGS. 3a, 3b, 3c and 3d illustrate the differences between the real operation and the predetermined or modeled operation of a nitrogen oxide trap, FIG. 4a schematically shows a processing in accordance with the present invention of the exhaust gases of a heat engine by a nitrogen oxide trap.
Figure 3B:
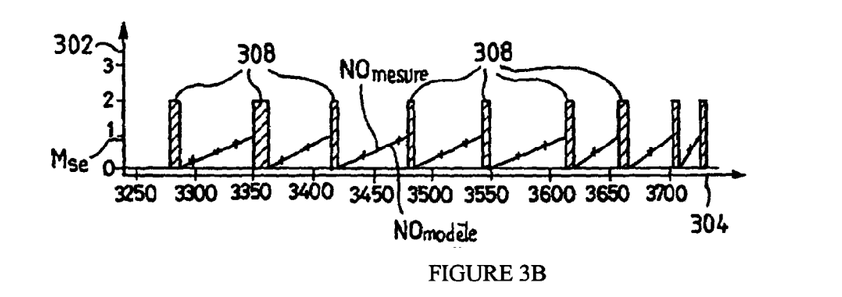

FIG. 3a shows instantaneous measurements related to masses (ordinate 300, in grams per second) of nitrogen oxides collected by the trap in question, while FIG. 3b shows the course of the total nitrogen oxide mass stored in this trap (ordinate 302, in grams) according to a same chronology (axis 304, in seconds).

In addition, the periods 308 of nitrogen oxide removal, triggered when the stored nitrogen oxide mass exceeds a threshold value $M_{thresh}$, are also shown.

When the trap in question is new, the measured masses ($NO_{measurement}$ curve) correspond to the masses predetermined by an operating model ($NOx_{model}$ curve) of the trap.

Figure 3C:
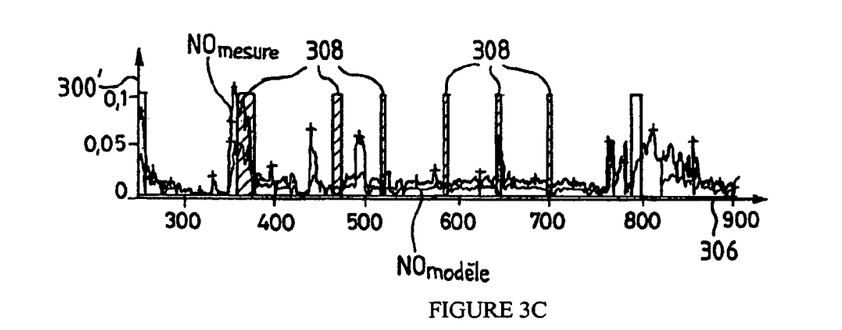
Figure 3D:
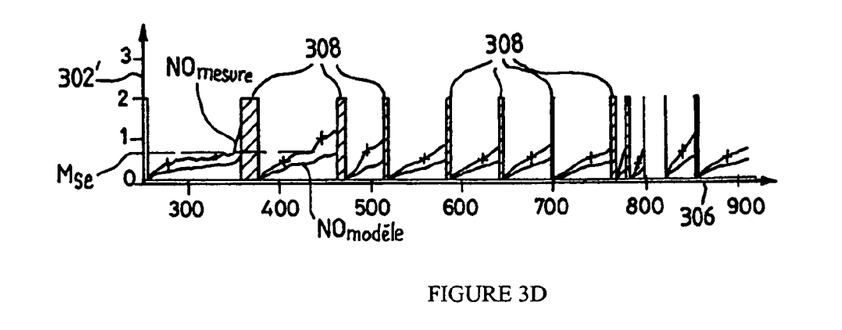

However, after a significant use of the trap, the measured masses ($NOx_{measurement}$ curve) are greatly different—up to a difference of 50%—from the masses predetermined ($NOx_{model}$ curve) by the operating model of the trap, as shown by means of FIGS. 3c and 3d, which show, respectively, measurements ($NO_{measurement}$ curve) related to the mass (ordinate 300', in grams per second) of nitrogen oxides collected by this used trap and to the mass of nitrogen oxides stored (ordinate 302', in grams) in this used trap, according to a same chronology (axis 306, in seconds), as well as the predetermined measurements ($NOx_{model}$ curve).

This is why the storage capacity of the trap is determined regularly, especially to determine the frequency of optimally removing from storage and thus limiting its wear and tear.

In this embodiment, this determination uses the observation according to which the signal supplied by a sensor sensitive to the oxygen quantity in the exhaust gases, such as a lambda sensor or a stoichiometric sensor, may be indicative of the storage capacity of a nitrogen oxide trap when this sensor is located downstream of the trap, as shown in detail below by means of FIGS. 4b and 4c.

In fact, the present invention, in this example, uses the observation according to which, during its operation, the variation of the storage capacity of a nitrogen oxide trap, described above by means of FIGS. 2a and 2b, may be such that the operation of the trap differs significantly from its modeling, as described by means of FIGS. 3a, 3b, 3c and 3d.

The presence of such a difference, or drift, of the trap prevents its optimal management, and in particular as regards actuated removals, in such a way that the nitrogen oxide level in the exhaust may increase, during the operation of the engine, beyond thresholds previously observed.

The present invention is also a result of the observation that such a drift is unforeseeable given that the sulfur content of the fuel used by a vehicle is variable, for example, from one country to the next.

For this purpose, a vehicle 400 (FIG. 4a) can be provided with a trap 404 processing the exhaust gases 406 emitted by its engine 402 and with a processor 405 provided with means 405' designed to diagnose the trap 404 according to the present invention.

Figure 4A:
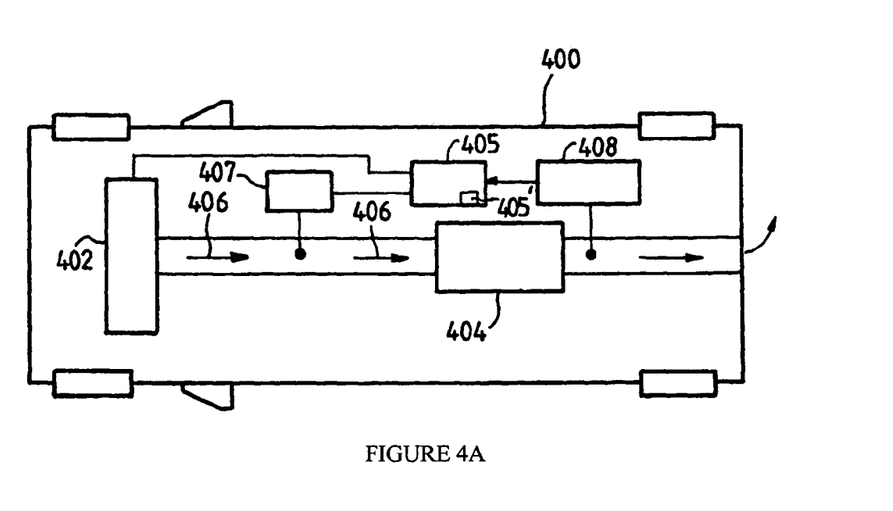

For this, this processor 405 can determine the quantity of nitrogen oxides stored in the trap by means of lambda sensors 407 and 408 located upstream and downstream of the trap 404, respectively.

Figure 4B:
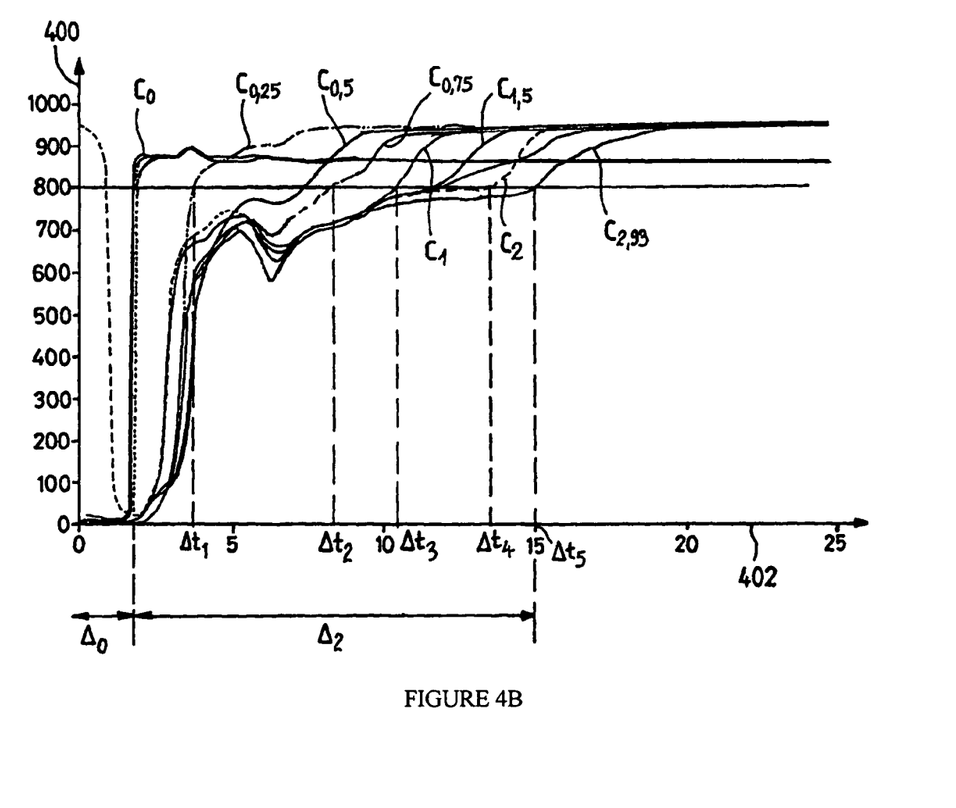
FIGS. 4b and 4c are diagrams illustrating the link between the signal supplied by a lambda sensor and the storage capacity of a trap.

In fact, as shown in FIG. 4b, each of these sensors supplies an "λ ON/OFF" electric signal, whose voltage (ordinate 400, in mV) is low when the engine operates in lean mode (period $\Delta_0$) or maximum when the engine operates in rich mode (period $\Delta_2$).

In fact, a lambda sensor supplies an electric signal as a function of the oxygen quantity in the gases in question. Now, during the operation of the engine in rich mode, this ratio increases markedly downstream of the trap because the latter uses the hydrocarbons contained in these gases to reduce the nitrogen oxides.

However, the signal ($C_{upstream}$) of the sensor upstream of the trap is independent of the quantity of nitrogen oxides stored in the trap, which makes it possible to determine the initialization of the removal from the trap.

However, it should be noted that this upstream sensor is not needed for the implementation of the present invention because it is not affected by the removal of NOx. According to one embodiment, a simple model makes it possible to simulate the behavior of this sensor on a vehicle.

From this initialization, the time $\Delta t_1$ needed for the level of the signal ($C_{downstream}$) of the sensor downstream of the trap to reach a threshold value, 800 mV in this example, can be measured, and this time depends on the quantity of nitrogen oxides contained in the gases in question as explained above.

Thus, FIG. 4b shows the curves Ci, which correspond to the signals obtained for traps having a stored quantity i of nitrogen oxides, i being considered to be in grams per liter.

Figure 4C:
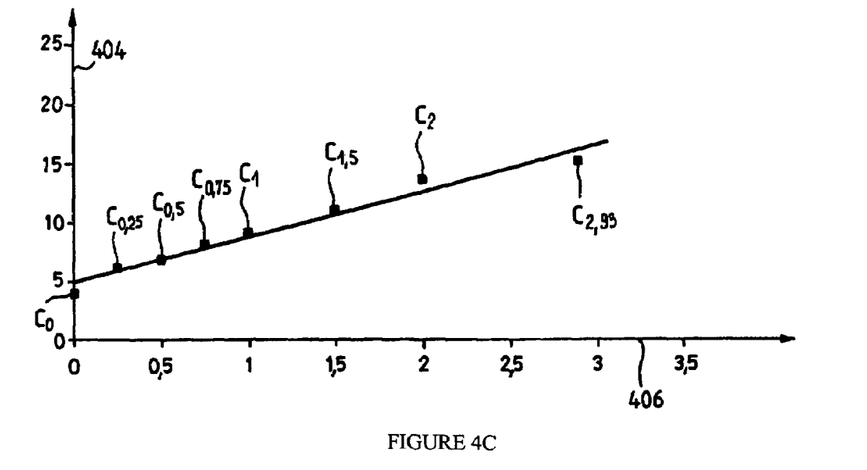

Such a relationship is more clearly demonstrated in FIG. 4c, which shows the times 404 (ordinate 404, in seconds) needed for a removal of the nitrogen oxide quantity from a trap as a function of this quantity of NOx (abscissa 406, in g/L) present in this trap.

When the time needed for the removal of nitrogen oxides conveys a low storage capacity, the processor 405 for diagnosing the trap may consider that the latter is poisoned by sulfur and actuate the removal of sulfur.

Following this removal of sulfur, if the time needed for the removal of nitrogen oxides again conveys a low storage capacity of the trap, the processor 405 considers that the storage capacity of the trap is reduced following its thermal wear and tear (irreversible and definitive degradation).

In this case, thanks to the measured removal time, the processor 405 may again evaluate this storage capacity to determine the optimal oxygen/reducers ratio of the gases to be sent during the removal of nitrogen oxides.

At this stage, it should be indicated that the trap 404 is generally composed of a substrate impregnated with an active phase called Wash-Coat, consisting, on the one hand, of precious metals (platinum, palladium, rhodium), which make possible the catalysis of oxidation and reduction reactions and, on the other hand, oxides of metals making possible the stabilization of the precious metals and the storage/removal of oxygen.

Moreover, the substrate is made of cordierite or a metal alloy and it generally appears in the form of a "honeycomb" structure.

Figure 5A:
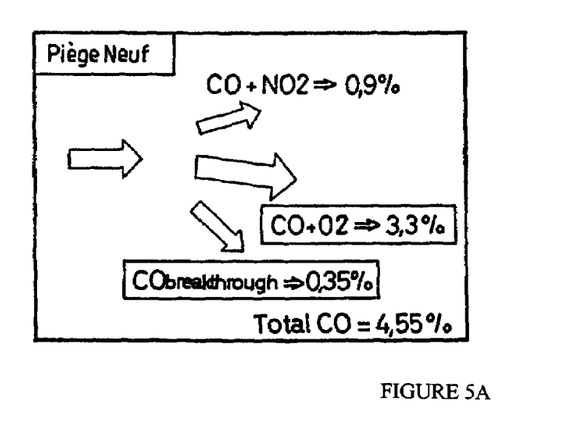
FIGS. 5a and 5b show the different reactions of the carbon monoxide supplied by an engine in rich mode for a new nitrogen oxide trap and for a used trap.
Figure 5B:
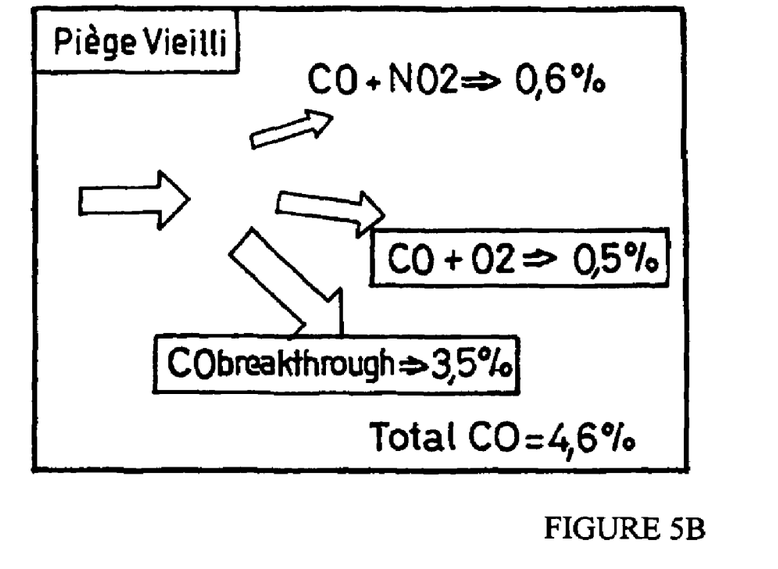

In this embodiment of the present invention, the observation that the oxidation capacity of a catalytic converter varies greatly during the operation of the nitrogen oxide trap, as shown below by means of FIGS. 5a and 5b, is also used.

The ratios, in which the carbon monoxide (CO) emitted by a heat engine is processed and converted by a new nitrogen oxide trap, are indicated in FIG. 5a.

Thus, 20% of this carbon monoxide (CO) reacts with the nitrogen oxide (NOx), 70% of this carbon monoxide reacts with the oxygen ($O_2$) and less than 10% of this carbon monoxide is emitted into the environment, which represents an optimal operation of the engine/after processing system.

As shown in FIG. 5b, the use of the same used nitrogen oxide trap, with the exhaust gases having the same oxygen/reducers $\lambda$ ratio, gives rise to 13% of the carbon monoxide reacting with nitrogen oxides, 10% of this carbon monoxide reacting with the oxygen, while more than 75% of the carbon monoxide produced is emitted into the environment, which represents an insufficient operation of the trap as regards certain standards pertaining to exhaust gases.

In fact, the oxidation capacity of a trap decreases with the increase in its wear and tear in such a way that, for an optimal operation of this trap, the oxygen/reducers $\lambda$ ratio in the exhaust gases should be increased in parallel with the increase in its wear and tear.

This is why, according to this aspect of the present invention, the oxidation capacity of a nitrogen oxide trap is evaluated regularly to adapt the oxygen $\lambda$ ratio in the exhaust gases.

For this purpose, the processor 405 uses the variation of the maximum value of the "$\lambda$ ON/OFF" electric signal supplied by the sensor 408 because, as described below by means of FIGS. 6a, 6b and 6c, the value of this signal is dependent on the quantity of hydrocarbons present in these gases for a given $\lambda$ ratio of the exhaust gases.

Figure 6A:
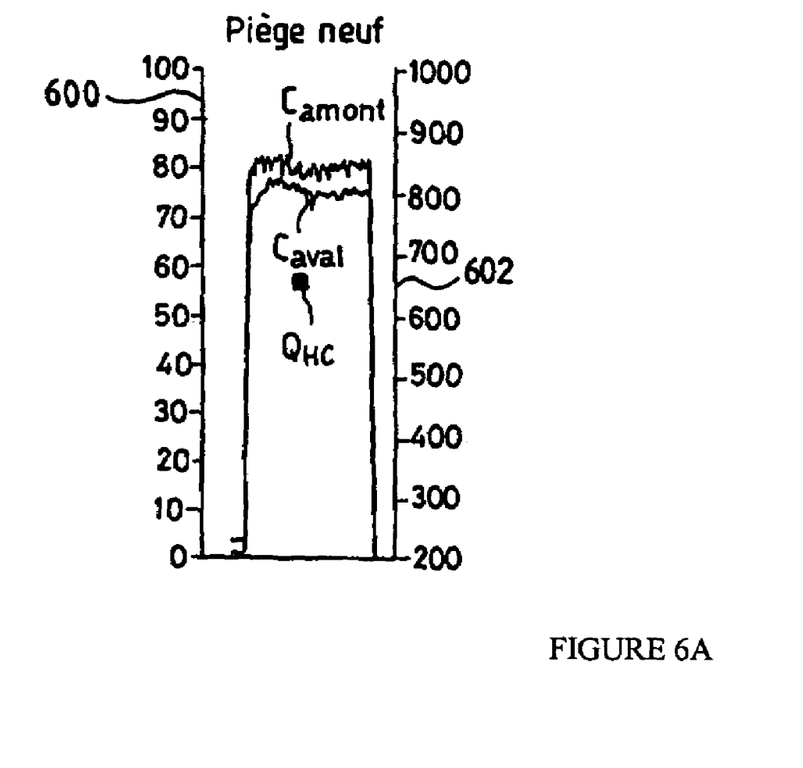
FIGS. 6a, 6b and 6c show variations of a signal emitted by a sensor measuring the oxygen λ ratio in the exhaust gases upstream of a nitrogen oxide trap.
Figure 6B:
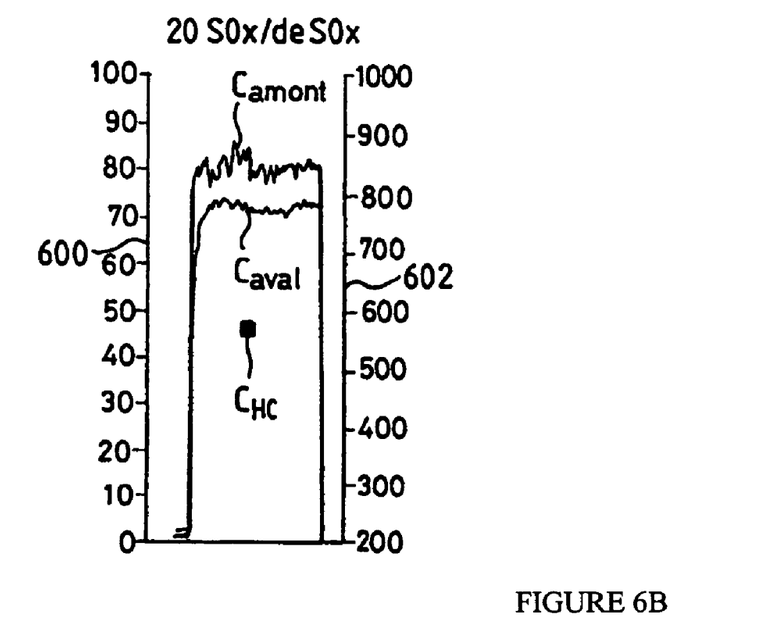
Figure 6C:
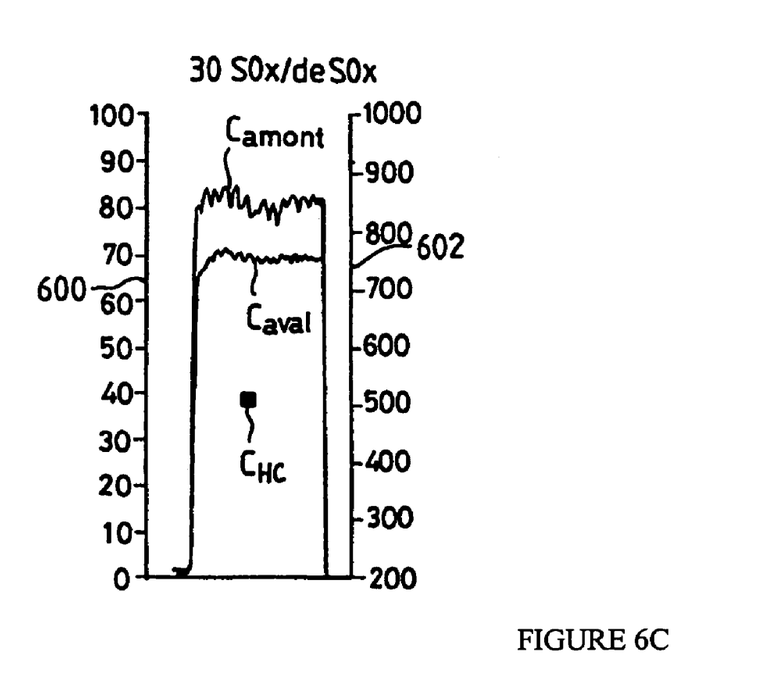

These FIGS. 6a, 6b and 6c show the values of the voltage of the "$\lambda$ ON/OFF" electric signal (ordinate 602, in mV), supplied by the sensor 408, as a function of the level of oxidation of the hydrocarbons (HC) measured experimentally for increasing wear levels of the nitrogen oxide trap in question.

This signal is generated upstream ($C_{upstream}$ curve) and downstream ($C_{downstream}$ curve) of the trap by a sensor (not shown), which makes it possible to observe that the value of this upstream voltage is independent of the quantity of hydrocarbons present downstream in the exhaust gases.

However, it is observed that the voltage of the signal supplied by the sensor 408 downstream of the trap decreases as a function of the quantity of hydrocarbons present in the gases 406, and the more the $Q_{HC}$ content (ordinate 600, in percentage of oxidized hydrocarbons) for converting hydrocarbons decreases, the greater is this quantity.

This variation of the signal emitted by the sensor 408 can be explained by recalling that the measurement of the oxygen content by a $\lambda$ sensor downstream of the nitrogen oxide trap is carried out, theoretically, after oxidation of all the reducers contained in these exhaust gases.

However, the rate of diffusion of hydrocarbons within the trap 404 is lower than that of the other components, and in particular of oxygen, in such a way that, when the $\lambda$ ratio is measured downstream of the trap 404, the higher the quantity of hydrocarbons, the lower is this $\lambda$ ratio.

Thus, it is possible to determine the hydrocarbon conversion rate of the trap as a function of the "$\lambda$ ON/OFF" signal emitted by the sensor 408, and this conversion rate make it possible to determine the oxidation capacity of the trap.

Consequently, by detecting a decrease in the oxidation capacity of the trap, a processor 405 according to the present invention can actuate an increase in the $\lambda$ ratio in the exhaust gases in order to maintain the operation of the trap under optimal conditions.

The invention claimed is:

1. A process for diagnosing the oxidation capacity of a catalytic converter processing exhaust gases of a heat engine by means of a trap which stores and then reduces the nitrogen oxides (NOx) contained in these gases, the process comprising the steps of:

determining the oxygen ($O_2$) content of the exhaust gases downstream of the trap by means of a sensor located downstream from the trap, and determining, from a level of a lambda ON/OFF signal emitted by the sensor, a decrease in the oxidation capacity of the trap, wherein the decrease in the oxidation capacity of the trap is determined by detecting a reduction of the hydrocarbon oxidation rate of the trap (i) during a regeneration phase in rich mode and (ii) after a phase of removal of nitrogen oxides (NOx) stored in the trap has substantially ended, wherein the reduction of the hydrocarbon oxidation rate is detected by detecting a decrease in a maximum voltage of a lambda ON/OFF signal provided by a sensor located downstream of the trap (i) during a regeneration phase in rich mode and (ii) after a phase of removal of nitrogen oxides (NOx) stored in the trap has substantially ended, this maximum voltage being dependent on a quantity of non-oxidized hydrocarbons present in the exhaust gases downstream of the trap, such that a decrease in the maximum voltage of the lambda ON/OFF signal indicates a reduction of the hydrocarbon oxidation rate of the trap.

2. A process in accordance with claim 1, wherein the level of the signal depends on a quantity of hydrocarbons or reducers present in the exhaust gases.

3. A process in accordance with one of the claims 1 or 2, wherein the storage capacity of the trap is determined by considering a time needed for the sensor to detect a threshold oxygen ratio in the exhaust gases while the nitrogen oxides (NOx) are reduced.

4. A process in accordance with claim 3, further including the step of using a lambda sensor determine the time to be considered in measuring the oxygen ratio in the exhaust gases downstream of the trap.

5. A process in accordance with claim 1 or 2, further including the step of using a lambda sensor upstream of the trap is used to determine a time needed for the sensor to detect a threshold oxygen ratio in the exhaust gases starting from a signal sent by the sensor upstream of the trap.

6. A process in accordance with claim 3, further including the step of actuating removal of sulfur from the trap when the measured time reaches a threshold time.

7. A process in accordance with claim 6, further including the step of actuating removal of nitrogen oxides (NOx) from the trap successively to the removal of sulfur from storage in such a way that, if the time needed to detect a threshold oxygen ratio reaches the threshold time, the value of the storage capacity of the trap is reduced.

8. A process in accordance with claim 1 or 2, characterized in that the level of the signal sent by the sensor is in volts.

* * * * *